June 13, 1961 F. R. NISSEL 2,988,134
CONTINUOUS BUTT JOINTING OF THERMOPLASTICS
Filed March 20, 1957
Fig. 1
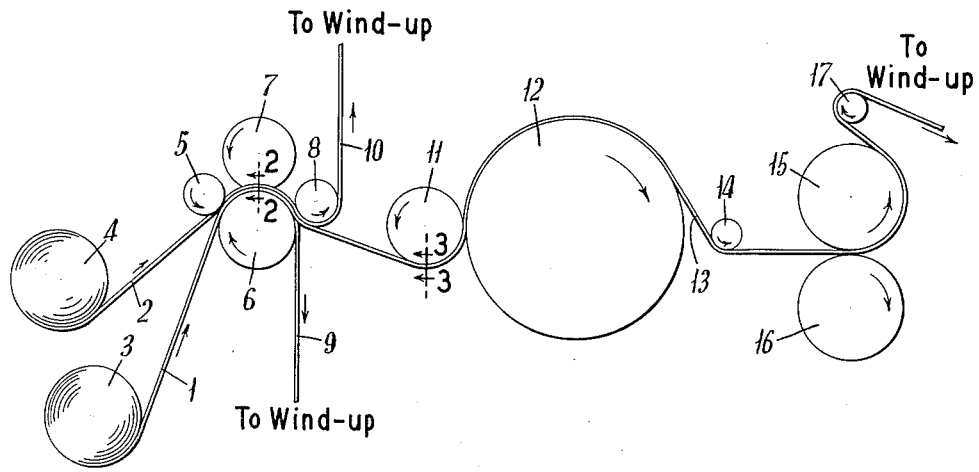
Fig. 2
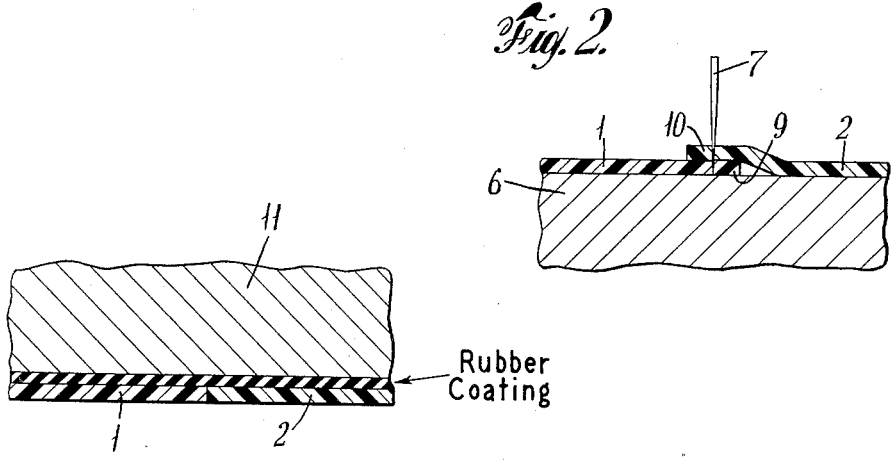
Fig. 3
INVENTOR.
FRANK R. NISSEL
BY
ATTORNEY

United States Patent Office 2,988,134
Patented June 13, 1961

2,988,134
CONTINUOUS BUTT JOINTING OF THERMO-PLASTICS
Frank R. Nissel, Plainfield, N.J., assignor to Union Carbide Corporation, a corporation of New York
Filed Mar. 20, 1957, Ser. No. 647,359
6 Claims. (Cl. 154—42)

This invention relates generally to a method and means for joining thermoplastic sheets and films and more particularly to a method and means for continuously forming a seam which is indistinguishable in appearance, thickness, and strength from any other part of the thermoplastic sheet or film.

A primary object of the invention is to provide a method and apparatus for continuous edge-to-edge joining of two or more thermoplastic sheets or films in such a manner as to produce a joint which is substantially indistinguishable, and which is substantially as strong as the plastic itself, and to provide thereby wide sheets of substantially homogeneous appearance, thickness, and strength.

It is an object of the invention to provide a method and apparatus for continuous edge-to-edge joining of two or more sections of material simultaneously into one continuous width.

Another object of this invention is to provide a method and apparatus for continuous edge-to-edge joining of thermoplastic sheets or films without requiring the use of pressure, adhesives, solvents, or plastic bonding agents.

A further object of this invention is to provide a method and apparatus for continuous edge-to-edge joining of two or more sheets which is extremely simple, economical, and commercially feasible.

Still another object of this invention is to provide thermoplastic sheets and film of unlimited width made by continuous edge-to-edge juxtapositioning and continuous joining of the sheets wherein the joint is no thicker than the remainder of the web.

Other objects and advantages of the invention will become apparent in the course of the description of the invention.

The width of thermoplastic film or sheets which can be made directly is limited by the operating width of available forming equipment. Equipment, such as calendars, extruders, or casting equipment which have been built thus far produce sheet or film stock having a maximum width of 6 to 8 feet. Attempts to build plastic sheet forming units capable of producing wider sheet stock have not been successful because of the formidable mechanical problems and greatly increased costs which would be involved. Consequently, in order to meet the increasing demand for sheet or film stock of 20, 30 feet and even greater width, such as are required for tarpaulins, motion picture screens, ditch liners, swimming pool liners, covers of various sorts, and many other applications, several sections of standard width material have been joined together.

Up to the present time, jointing of two plastic sheets has usually involved the use of overlapping joints which are fused together by pressure and heat, or, in addition, the use of a solvent, adhesive or other plastic bonding means in order to cement the edges of the sheet together. These methods have many disadvantages in that they produce seams or seals which have very serious defects. Almost always the overlapped seam area is thicker than the remainder of the web. This area is distinctly visible and is particularly objectionable in cases where the web is to be used as a motion picture screen and in other similar applications where the thickened area is a distraction. A thick seam prevents easy handling of the web since such seams form ridges when the web is wound into a compact, continuous roll. Such a joint is almost invariably weaker than the rest of the web and is prone under conditions of strain to delamination and edge-tearing.

The process and apparatus herein disclosed for continuously butt jointing together two or more sheets or films of fusible thermoplastic material, such as for example, sheets or film of polymethylmethacrylate, polyvinyl chloride, polyethylene, vinyl chloride/vinyl acetate copolymer, polystyrene, cellulose derivatives, and all other fusible thermoplastic resin compositions require no overlapping of edges. The proposed new process does not require any sealing pressure, solvents or adhesives. The seals or seams which are provided are indistinguishable in appearance, thickness, and strength from any other part of the sheet or film. The new process and apparatus are also unique in that provision can be made for inclusion of an embossing step to provide a sheet or film having any desired surface finish, corrugation, or contour.

No previously known process and apparatus provide for the continuous forming of such continuous, homogeneous, and indistinguishable seals. Thermoplastic sheet and film jointed by the new process and apparatus are therefore superior to the corresponding prior art materials. These and other advantages will become apparent in the following discussion of the invention.

It has now been found that webs such as sheeting or film formed from a heat-fusible thermoplastic polymer can be self-edge-bonded together, the bond or joint being substantially of the same thickness and strength as the unbonded areas of said webs by placing an edge of one web in abutting edge to edge register with an edge of another web, the webs in such register relationship being supported on a smooth heated surface such as a metal drum or belt, heating at least the abutting edges of said webs by contact with said heated surface to the fusion temperature of the thermoplastic while continuously maintaining the abutting edges in exact register said heating being in the absence of any upsetting pressure on said edges during their fusion, and then cooling the fused edge bond.

The process and apparatus of this invention will be better understood by reference to the accompanying drawing in which edge bonding or butt welding of two thermoplastic sheets is shown schematically and wherein:

FIG. 1 is a schematic side elevation of an apparatus embodying the invention;

FIG. 2 is a sectional view on the line 2—2 of FIG. 1; and

FIG. 3 is a sectional view on the line 3—3 of FIG. 1.

Two sheets 1 and 2 of the thermoplastic material to be joined are unwound from their respective feed rolls 3 and 4 and fed, with the edges to be joined in overlapping relation, to a slitter device assembly comprising a backing roll 6, a cutter 7, and two idler guide rolls 5 and 8 which ride against the backing roll 6 just ahead of and just after the cutter 7. The slitter device slits both sheets simultaneously longitudinally through the overlapped sections. The severed edge trim strips 9 and 10 are led away in opposite directions to suitable wind-up or other collecting devices (not shown).

On leaving the slitter assembly and thereafter, the two slit sheets are in exact and continuous edge-to-edge contact. The two sheets 1 and 2 with their edges aligned and in exact and continuous contact as indicated in FIG. 3 are led onto a revolving heated drum 12. The aligned sheets are brought into uniform contact with the drum 12 by means of a pressure-loaded, rubber coated applicator roll 11. This latter arrangement assures the laying of the web sections onto the heating surface in such a manner that the edges that are to be joined are in perfect register, that is, in exact edge-to-edge contact with each other at every point, with no overlap. The heating drum is at such a temperature as to fuse the sheet edges together. When fusion is complete, the resultant integral sheet 13 is removed from the heating drum by means of a stripper roll 14. The sheet 13, if desired, thereafter passes through an embossing unit comprising an embossing roller 15, rubber covered back-up roller 16 and stripper 17. It is then cooled and wound up. The embossing unit may, if desired, be by-passed or omitted and the stripped sheet 13 passed directly from the stripper 14 to the cooling and rewinding assemblies (not shown).

In feeding the two sheets 1 and 2 into the slitter assembly, substantially equal tension is applied to the sheets in order to avoid unequal stretching after they leave said assembly. Any uneven stretching will tend to throw the edges out of register and hence a disjointed seam will be obtained.

The width of the overlap (FIG. 2) need not exceed one inch and can be narrower. The limiting factor with respect to the width of the overlap is that there always be an overlap under the cutter and that the trim strips have sufficient strength to be taken up continuously by means of a wind-up or other pick-up device so as to facilitate their removal.

The cutter assembly may employ a score cutter or even a simple blade. Other types of cutters or slitters which cut both sheets cleanly and simultaneously, such as shear cutters, may also be used. The idler guide rolls 5 and 8 which ride against the backing roll 6 just prior to and just after the cutter 7 prevent motion of the sheets relative to the slitter roll and help provide a more uniform cutting action. The backing roll 6 itself is preferably driven by a variable speed drive that permits the speed of the roll to be varied from slightly below to slightly above that at which the heating drum is driven. The speed of the backing roll 6 is so regulated as to provide a slight speed differential between it and the heating drum which keeps the sheets under a slight tension and thus properly butted until they are laid onto the heating surface. Excessive tension should be avoided, however, this being recognizable by a narrowing or "necking down" of the original width of the sheet and difficulty in maintaining precise edge-to-edge butting. As a further aid in maintaining proper edge matching, the distance between the slitter and heating surface is kept to a minimum.

The function of the applicator roll 11 is to bring all portions of the web into even contact with the heating surface. This prevents the formation of air pockets between the web and the heating surface. This applicator roll is made of or, alternatively, covered by a resilient rubber-like material (FIG. 3) which is capable of absorbing minor variations in the thickness of the web or minor irregularities in the surface or alignment of the heating device, i.e., heating drum or belt. The roll is preferably pressure loaded although it may be either pressure or distance loaded.

Fusion is preferably carried out on the surface of the heated drum 12 which may be of any convenient diameter and have a length at least as great as the final web width. Alternatively, fusion can be accomplished on the surface of a moving, endless, heated belt or heated narrow wheels wide enough to heat and fuse the areas at and adjacent to the abutted edges. The important variables in the fusion stage of the process are temperature and heating or contact time. Temperature and contact time must be great enough to permit proper fusion to take place. If the temperature is too low, a weak seal will be obtained. The same is true if the contact time is too low. Temperatures which are unduly high tend to make the stripping operation difficult and in some cases might cause a decomposition of the material. An overly long contact time, that is, very low web speed, does not generally affect the properties of the web adversely, but is usually undesirable since it is not economical. In general, the choice of optimum temperature is dictated primarily by the nature of the material which is being sealed while the contact time or web speed is dictated by the thickness of the web.

The heating action itself provides certain beneficial results in the properties of the material. First of all, the heating affords some annealing which reduces the strains in the web and improves its dimensional stability at elevated temperatures. The tear strength of the material is also improved by the heating action. The amount of improvement depends upon the initial tear strength; materials which have poor initial tear strength receive a greater relative benefit than those which have a good initial tear strength.

The web as it leaves the heating surface has a relatively glossy finish and it is generally desirable to emboss the material with either a matte or decorative finish before the web is cooled. This may be done by passing the web through an embosser assembly of conventional design, as indicated in FIG. 1.

The process and apparatus of this invention can be employed to join two or more sections of material simultaneously into one continuous width. The method and apparatus can be used to join sections of different composition and/or thickness. Materials can also be of different colors to provide multi-colored striped webs. In the latter instance, non-linear boundaries between the different colors are sometimes desired for decorative reasons.

Serrated, undulated, and other non-linear edges on the thermoplastic webs can be formed by using an appropriately shaped cutter.

In order to improve the release of the thermoplastic web from the heating surface, the latter may be provided with a thin coating of a releasing agent such as a silicone releasing agent, polytetrafluoroethylene, or the like. This coating should be inert towards the thermoplastic web, have the necessary thermal stability to withstand the sealing temperatures, and be thin enough to allow adequate heat transfer to the web.

The following examples are intended to illustrate and not to limit the invention in any way.

*Example 1*

A mixture consisting of the following parts by weight

| | Parts |
|---|---|
| Polyvinyl chloride (Bakelite Co.-QYSQ resin) | 68.0 |
| Dioctyl phthalate | 28.5 |
| "Vanstay HT" (a mixture of cadmium and barium laurates sold by H. T. Vanderbilt Co. as a heat-stabilizer for vinyl resins) | 1.0 |
| Trioctyl phosphite (auxiliary heat-stabilizer) | 0.5 |
| Diglycidyl ether of 2,2-bis-(p-hydroxyphenyl)-propane (heat stabilizer) | 2.0 | was preblended for 15 minutes in a Hobart mixer, fluxed and mixed in a Banbury mixer under a ram pressure of 65 p.s.i. until the mass temperature reached 150° C. (about 4 minutes) sheeted and given ten end-passes on a two roll mill at 165° C., then calendered into 5 mil (0.005 inch thick) film on a four roll inverted L type calender whose offset, top, middle and bottom rolls were at 160° C. 165° C., 170° C., and 175° C., respectively. Two 7.5 inch wide rolls of this film were butt jointed continuously into a 14 inch wide film on the apparatus shown in FIGURE 1 using a 2 foot diameter by 15 inch long heating drum 12. The feed films 1 and 2 were overlapped one inch; the heating drum 12 was maintained at 175° C.; and the web speed was 50 ft./min. During one part of the run, the 14 inch wide edge-bonded film 13 issuing from the stripper was passed through an embosser consisting of a matte finish embossing roll 15, a rubber back-up roll 16, and embosser stripper roll 17. During another part of the run, the embosser was by-passed and the film 13 was led from the stripper 14 directly to the cooling and wind-up rolls.

On careful examination, the weld on the unembossed film was discernible as a very fine line. The weld on the embossed film could not be distinguished from the remainder of the film. In both cases, the weld and area immediately adjacent thereto had the same thickness and strength as the rest of the film as reflected by thickness measurements with a micrometer and metricator thickness gauge and by tensile strengths in the direction perpendicular to the joint, respectively.

*Example 2*

A mixture consisting of

| | Parts |
|---|---|
| Vinyl chloride (95%)—vinyl acetate (5%) copolymer (Bakelite VYNW resin) | 63.0 |
| Dioctyl phthalate | 33.5 |
| "Vanstay HT" | 1.0 |
| Trioctyl phosphite | 0.5 |
| Diglycidyl ether of 2,2-bis-(p-hydroxy-phenyl)-propane | 2.0 | was compounded substantially according to the procedure of Example 1 and calendered into 20 mil sheet. Two sections of this 20 mil sheet were then butt jointed together in the same manner as in Example 1 except that only a ¾ inch overlap was used and a web speed of 15 ft./min. was maintained. The observations made on this product agreed in all major respects with those stated in the previous example.

*Example 3*

Two sections of calendered 5 mil films made from (A) commercial calendering grade polyethylene compound (Bakelite's DDDA–4001) and (B) commercial grade polyethylene compound (DDDA–4001) into which had been incorporated ¼ percent zinc stearate were butt welded by the method of Example 1 using the same apparatus and operating conditions but with a heating drum temperature of 160° C. While both sets of films fused and welded satisfactorily, difficulties were encountered during the stripping of the product from (A) from the heating drum, whereas no such stripping difficulties were experienced with (B).

Example 3 illustrates the desirability in some instances of adding a minor amount of lubricant or other modifying agent, e.g., antioxidant, heat stabilizer, etc. to the parent compound before it is made into standard width film or sheet to improve its release or some other behavior during the butt jointing process.

The thermoplastic material which can be edge-sealed may be either flexible or rigid. Rigid material, as for example polyvinyl chloride, may be edge-joined with flexible material such as plasticized polyvinyl chloride with equal facility.

With respect to the edge bonding of rigid thermoplastic sheet material such as unplasticized polyvinyl chloride of appreciable thickness, that is, above about 0.020 inch thickness, it is desirable to moderately preheat such material to provide them with sufficient flexibility to be threaded through the apparatus and to conform to the heating surfaces.

Flexible thermoplastic films such as polyethylene and plasticized polyvinyl chloride ranging in thickness from 0.004 to 0.020 have been satisfactorily edge-bonded with no difficulty. The minimum thickness of thermoplastic film which can be edge-bonded is primarily dependent on its having sufficient tensile strength at the sealing temperatures to be stripped from the heating surface without tearing and such thickness may be as thin or thinner than 0.001 inch. The upper thickness limit is not dependent on the sealing process itself but on the commercial availability of thick thermoplastic material, since presently thermoplastic sheet material is rarely produced in continuous lengths having a thickness more than 0.10 inch.

The products of this invention are particularly adaptable for use as tarpaulins, agricultural covers, ditch liners, swimming pools, swimming pool covers, multicolor striped awnings, tents, silage bags, machinery covers, motion picture screens, balloons, and many other products.

It will be understood that various changes may be made in the form, details, arrangements and proportions of the parts without departing from the scope of the invention.

I claim:

1. A method of continuous edge-to-edge joining of thermoplastic sheet material which comprises edge matching and aligning sheets of the material by bringing their edges in exact abutting contact, passing the abuttingly aligned sheets onto a traveling heated surface, traveling said sheets with said surface until fusion of the edges is complete and removing the resultant sheet from the heated surface.

2. A method of continuous edge-to-edge joining sheets of thermoplastic material which comprises bringing the sheets together with their edges in overlapped relation, slitting the sheets longitudinally through the overlapped edge sections whereby the said sheets fall into edge-to-edge abutting alignment, removing the severed edge trim strips, passing the sheets onto a traveling heated supporting surface while maintaining the edges in abutting alignment, traveling the sheets with said surface until fusion of the edges is effected, and stripping the resultant sheet from the heated supporting surface.

3. In an apparatus for fusion welding the abutting edges of thermoplastic material, a cutter assembly, means for continuously feeding sheets of thermoplastic material with their edges in overlapped relation through said cutter assembly which slits the said sheets through the overlapped sections whereby the sheets fall into edge-to-edge abutting alignment, a moving heated surface adjacent to said cutter assembly, an applicator roll for receiving the aligned sheet material from said cutter assembly and applying the material onto the heated surface with the edges maintained in abutting relation whereon the edges of the sheet material are fused together, and stripping means for removing the resultant fused sheet from the heated surface.

4. In an apparatus for fusion welding the abutting edges of thermoplastic material, a cutter assembly comprising a cutter and cutter backing roll, means for continuously feeding sheets of thermoplastic material with their edges in overlapped relation through the cutter assembly whereby the said sheets are slit longitudinally through the overlap and fall into edge-to-edge abutting alignment, a heated moving surface, an applicator roll for applying the material with the edges maintained in abutting relation onto said heated surface whereon the edges of the sheet material are fused together, and means for stripping the resultant fused sheet from said heated surface.

5. In an apparatus for fusion welding the abutting edges of thermoplastic material, a cutter assembly comprising a cutter backing roll, an idler guide roll for guiding sheet material onto said cutter backing roll with the edges thereof in overlapping relation, a cutter which slits the sheets through the overlapped section whereby the sheets fall into edge-to-edge abutting alignment, a second idler guide roll for guiding the abuttingly aligned material off of the cutter backing roll, means for removing the edge trim strips, a revolving heated drum, an applicator roll for applying the thermoplastic material from the second idler guide roll of the cutter assembly onto the said revolving drum with the edges of the material maintained in abutting relation whereon the edges of the sheet material are fused together, and means for stripping the resultant fused sheet from the said heated drum.

6. In an apparatus for fusion welding the abutting edges of thermoplastic material, a variable speed cutter backing roll, an idler guide roll for guiding sheet material onto said cutter backing roll with the edges thereof in overlapping relation, a cutter which slits the sheet material through the overlapped sections whereby the sheets fall into edge-to-edge abutting alignment, a second idler guide roll for guiding the abuttingly aligned material sheets off of the cutter guide backing roll, means for removing the edge trim strips, a heated revolving drum, a pressure-loaded, rubber coated applicator roll for applying the thermoplastic material from the second idler guide roll onto said heated drum with the edges of the material maintained in abutting relation whereon the edges of the sheet material are fused together, and a stripping means for removing the resultant fused sheet from the heated drum.

References Cited in the file of this patent

UNITED STATES PATENTS

| | | |
|---|---|---|
| 1,763,227 | Elmendorf | June 10, 1930 |
| 1,899,067 | Trumbull | Feb. 28, 1933 |
| 1,916,134 | Dike | June 27, 1933 |
| 2,438,685 | Stevens | Mar. 30, 1948 |
| 2,469,849 | Silver | May 10, 1949 |
| 2,516,280 | Welch | July 25, 1950 |
| 2,556,476 | Lamport | June 12, 1951 |
| 2,587,685 | Bergstein | Mar. 4, 1952 |
| 2,590,032 | Petry | Mar. 18, 1952 |
| 2,614,953 | Anglada | Oct. 21, 1952 |
| 2,621,138 | Messing | Dec. 9, 1952 |
| 2,770,080 | Hoyt | Nov. 13, 1956 |
| 2,783,175 | Smith et al. | Feb. 26, 1957 |